Sept. 6, 1966     B. J. BAKER ETAL     3,271,169
FOOD PACKAGE FOR MICROWAVE HEATING
Filed Feb. 1, 1963     2 Sheets-Sheet 1
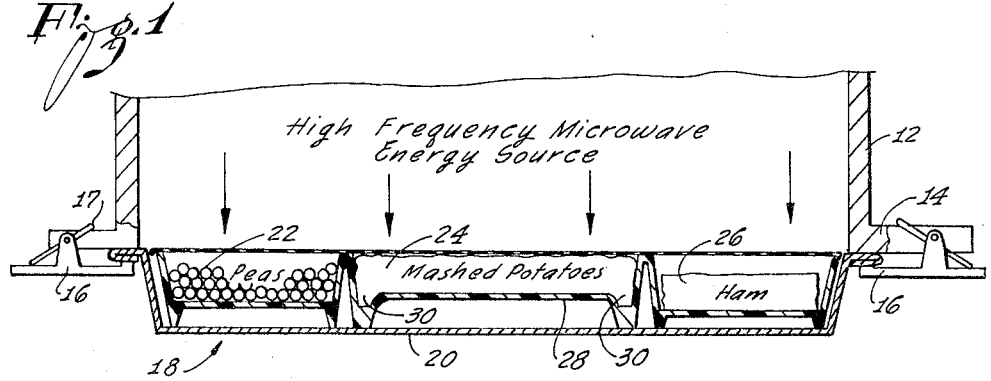
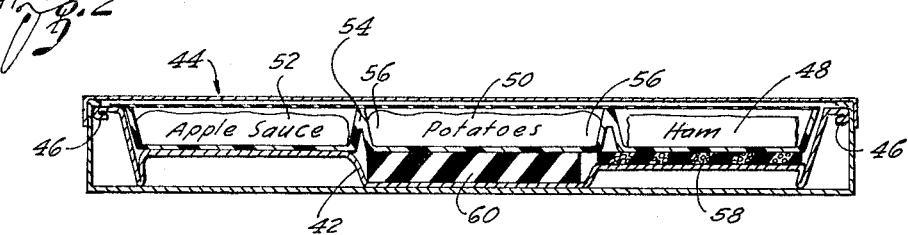
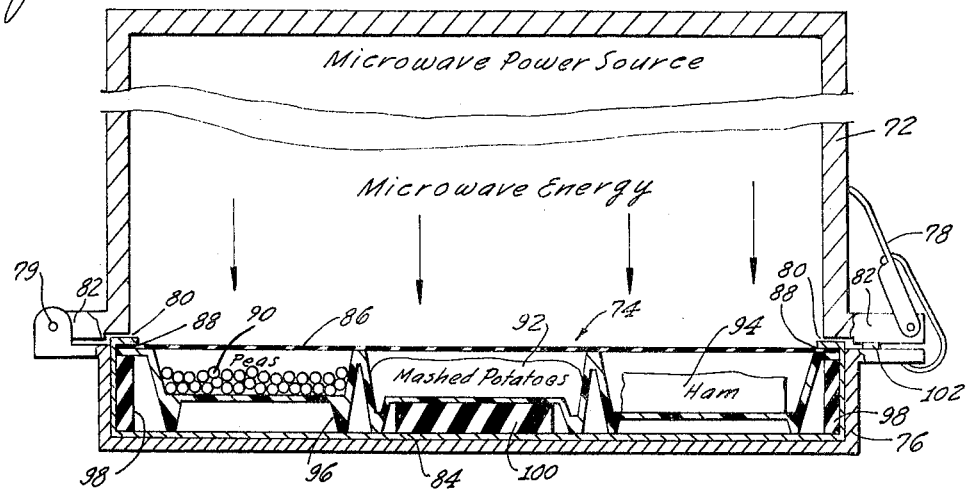
INVENTORS:
Berkley J. Baker
Edward E. Krajewski
By Alan C. Rose
Attorney

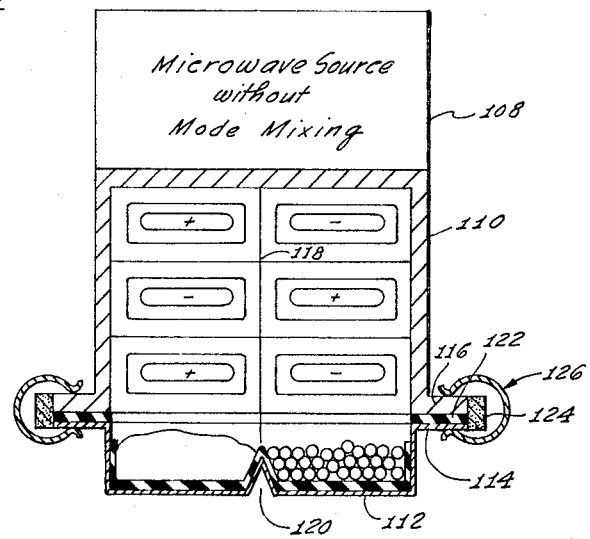
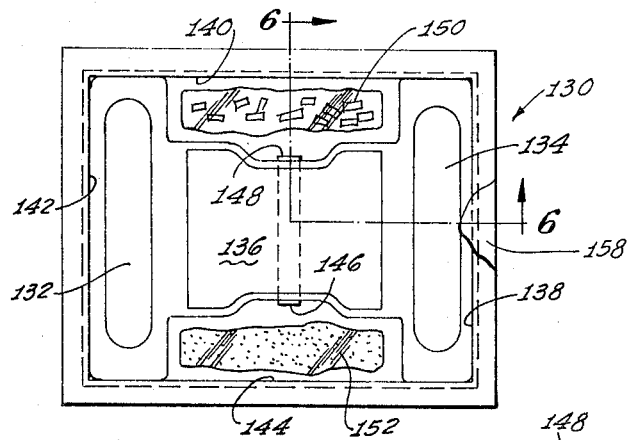
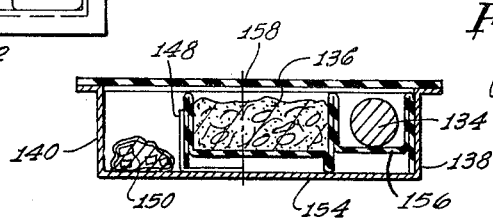

3,271,169
FOOD PACKAGE FOR MICROWAVE HEATING
Berkley J. Baker, Sunnyvale, and Edward Z. Krajewski, Belmont, Calif., assignors to Litton Precision Products, Inc., a corporation of Delaware
Filed Feb. 1, 1963, Ser. No. 255,640
5 Claims. (Cl. 99—221)

This invention relates to microwave cooking and the packaging of food for microwave heating.

In the microwave heating field, it would be useful to heat prepackaged refrigerated or frozen meals of the type commercially sold in aluminum plates. These are widely available in supermarkets and other grocery stores. While these dinners may be heated in conventional gas or electric ovens without serious problems, the time for thawing and heating of the meals generally ranges from 20 to 40 minutes. While it would be quite advantageous to defrost and heat these meals by microwave heating techniques, a number of problems are presented. Initially, the food usually rests directly on the compartmented aluminum plate in the standard prepackaged frozen dinners. As microwaves do not heat most food material lying directly against a conducting surface, the present geometries of the conventional frozen dinners are not suitable for microwave use. A second problem involves the different microwave properties of different foods. Thus, some foods absorb microwave energy to a high degree while other foods are nearly transparent to microwave energy. This difference in microwave properties must be taken into account if frozen dinners are to be properly heated by the microwaves. Other problems involve the different terminal heat which is desired for different types of foods. Thus, while it is important to have meat and potatoes piping hot, other food, such as cranberry or apple sauce, should not be heated to any substantial degree but should merely be defrosted. Another problem of microwave cooking involves overheating and burning of the edges of food servings. Thus, the edges tend to defrost first, and may absorb greater amounts of energy and be overheated to the point that the edges of the food portions are burned.

A general object of the present invention is to overcome the problems noted above with regard to the thawing and reheating of prepackaged frozen or refrigerated dinners. A collateral object of the present invention is the construction of a food package suitable for heating by microwaves.

Another object of the invention is to increase the uniformity of heating portions of frozen food. A further object of the present invention is to heat diverse portions of food to final temperatures suitable for serving, irrespective of the microwave properties or the different desired final temperatures of each of the food portions.

The foregoing objects may be achieved in accordance with an important aspect of the present invention by the use of a dielectric plate upon which separate portions of food are placed, and an underlying conductive layer which is spaced at different distances from respectively different portions of food. As microwave energy is applied to the upper surface of the microwave package, it passes through the food and sets up a standing wave pattern with the conductive foil beneath the plate of food. The microwave energy is at very low levels immediately adjacent the conductive foil. It gradually increases in intensity with increasing distance from the conductive foil. At the widely used microwave frequency of 2,450 megacycles per second, a quarter wave length is approximately equal to 1.1 inches. At distances within about one-quarter inch of the wall of the microwave cavity, defined by the conductive foil in the present case, the microwave energy is of very low intensity. The intensity increases progressively with increased distance from the conductive sheet to a maximum for cooking purposes at about one-quarter or more wave length from the conductive wall.

The electrical distance from the conductive wall may be varied in any of several different ways. In accordance with one technique, the plate may have food sections which are located at various heights above a flat conductive sheet; alternatively, the plastic plate may have compartments which are all at the same height, and the underlying conductive foil or sheet may be raised or lowered in different sections to increase or decrease the field strength in the desired area. Alternatively, both the various food compartments and the conductive foil may be flat and parallel. In the space between the compartments and the conductive surface, dielectric material of varying dielectric constants may be located. By using different dielectric constants, the electrical distance may be varied. When high dielectric constant material is used, the electrical spacing may be greatly increased and the physical distance of the quarter wave length point greatly reduced. Other dielectric support materials, such as polyfoam, having a dielectric constant of about 1.0 do not alter the one-quarter wave length point from that of free space. Microwave energy may also be concentrated by other techniques, such as by the use of reradiating elements of a suitable configuration, preferably located in the food package.

In accordance with an important feature of the invention, therefore, a microwave cooking food package is provided with a conductive foil or sheet which terminates in a rim for engagement with a waveguide to form a compact oven with the foil or sheet constituting one wall of the oven. The food package may include several spaced portions of food and integral arrangements for selectively concentrating microwave energy in different portions of the food. The source of microwave energy may be provided with a flange which matches the conductive rim of the frozen food package and is provided with clamps for holding the rim of the frozen food package in tight engagement with the source of microwave energy.

In accordance with another aspect of the invention, burning of food at its edges may be reduced by thickening a serving of food near its edges to delay defrosting; similarly, by selectively increasing the distance from the conductive foil near the center of the material, increased energy is applied to the center of the food and the tendency for overheating at the periphery is greatly reduced.

The microwave cooking techniques described above have the advantage of permitting the selective heating of different frozen foods to the desired degree without the usual disadvantages of burning or overheating portions of the food. The oven structure, in which a conductive foil forming part of the package constitutes one wall of the oven, has the advantages of compactness and economy as compared to the structures of the prior art.

The novel features of the invention which are believed to be characteristic of the invention, both as to its organization and method of operation, together with further objects and advantages thereof, will be better understood from the following description considered in connection with the accompanying drawings in which several embodiments of the invention are shown, by way of example. It is to be expressly understood, however, that the drawings are for the purpose of illustration and description only and are not intended as a definition of the limitations of the invention.

In the drawings:

FIG. 1 is a view of a microwave cooking apparatus in accordance with the invention in which a frozen food package is being heated;

FIG. 2 is an alternative form of frozen food package suitable for microwave heating;

FIG. 3 shows a further alternative arrangement in which the outer package for the frozen food is made of aluminum;

FIG. 4 shows another microwave cooking apparatus; and

FIGS. 5 and 6 are alternative views of another food package suitable for microwave cooking.

Referring more particularly to the drawings, FIG. 1 shows a conductive structure 12 which forms the output from a high frequency microwave energy source. The structure 12 may be a large wave guide, or it may be a small microwave cavity provided with the usual high frequency source and, if desirable for uniform microwave energy distribution, a suitable mode mixer. The foregoing structures are all well known per se.

At its long end the conductive structure 12 is provided with a flange 14 and a latching mechanism 16. The frozen food tray 18 is firmly held in position by the latches 16, as biased by springs 17. The tray 18 includes an outer sheet 20 which may either be made of conductive sheets, or a material such as cardboard provided with a conductive foil surface. Around the edges of the tray 18 the material 20 is turned over to form a bead which is clamped into engagement with the conductive structure 12 by the latch 16. It is important that good electrical conductivity be made between the conductive surface of sheet 20 and the microwave radiating structure 12. In passing it is noted that suitable electrical interlocking structures must be provided for the microwave unit. Accordingly, a supplemental shield may be provided to cover the opening occupied by the food tray 18 so that energization is not possible when the lower end of the wave guide 12 is open.

In accordance with the present invention the food portions, such as the peas 22, the mashed potatoes 24 and the ham 26, may be located at different distances from the conducting surface 20, as dictated by the heating properties and requirements of the different portions. In the embodiment of FIG. 1, this spacing is accomplished through the use of a compartmented dielectric or plastic plate 28, having depending portions forming a base surface in engagement with conductive sheet 20. As observed in FIG. 1, the ham 26 is located close to the conductive sheet 20, the mashed potatoes 24 are furthest from the conductive sheet, and the peas 22 are located at an intermediate distance.

As mentioned above, the heating effect is inversely proportional to the proximity to the conductive sheet. Thus, the ham 26 which is close to the conductive sheet will be in a less intense microwave field than the mashed potatoes 24. Because of the salts in ham, it will heat properly even though it is in a relatively weak field. Similarly, the intensity of the microwave field in the vicinity of the peas 22 will be intermediate that applied to the ham and the potatoes. It may also be noted that the compartment from the mashed potatoes 24 is provided with recesses 30 to increase the volume of mashed potatoes at the outer periphery of this portion of food. By this technique the thawing and heating of the edges of the mashed potatoes is retarded and burning is prevented. It may be noted that in the case of the peas 22 or other loosely packed frozen food, the adverse heating at the edges does not occur to an appreciable extent. Accordingly, the enlargement at the periphery may be dispensed with or reduced, as compared with solidly packed and frozen material, such as mashed potatoes, squash or the like. It may also be noted, with respect to the plastic plate 28 of FIG. 1, that it could be placed on the floor of a conventional closed microwave oven either with or without the underlying conductive sheet 20.

FIG. 2 shows an alternative embodiment of the invention. In this figure, another frozen food package suitable for use with the microwave energy source 12 is disclosed. In FIG. 2 the formed aluminum sheet 42 is packaged within a cardboard box 44. As in the structure of FIG. 1, the aluminum sheet 42, which is intended to form the closure for the microwave energy source, is provided with a peripheral bead 46 for tight conductive engagement with the microwave structure 12. In the case of the arrangement of FIG. 1, the height of the food compartments above the aluminum sheet was varied; in the arrangement of FIG. 2, however, the plate provides food at a single level and the aluminum sheet 42 is formed in different manners to vary the distance of the food portions from the metal sheet. In FIG. 2 the three disclosed food portions are the ham 48, the potatoes 50, and the apple sauce 52. Because of the salt content of ham it is readily heated by the magnetic component of microwave fields. Similarly, the apple sauce 52 should not be heated substantially as the desired serving temperature is relatively low. The potatoes 50, however, require intense microwave fields for proper thawing and heating to desired temperature levels. Reflecting these various requirements, the aluminum foil is immediately below the plastic plate 54 under the section containing the apple sauce 52 and is far away from the central section of the plate 54 which contains the potatoes 50. In addition, it is located at an intermediate distance below the section of the plate containing the ham 48.

The potatoes 50 have again been arranged with enlarged outer edges 56 to retard thawing and heating. To further reduce the microwave field in the vicinity of the edges of potatoes 50, the aluminum material underlying the apple sauce and the ham has been extended to partially underlie the peripheral portions of the helping of potatoes 50. This has the effect of reducing the field strength near the edges of the potatoes and thus prevents burning of these edges.

The intensity of the microwave energy depends upon the electrical distance from the end wall of the microwave cavity or wave guide which is provided by the aluminum foil 20 of FIG. 1 or 42 of FIG. 2. The electrical distance may be varied through the use of dielectric material for different dielectric constants. Thus, a wave length in free space is significantly greater than a wave length in high dielectric constant material for microwaves of a given frequency. This phenomenon can be used to advantage, in accordance with one aspect of the present invention, by using dielectric spacers of different dielectric constants. Thus, as shown in FIG. 2, a spacer 58 is provided under the ham which has a low dielectric constant. The spacer 58 may be made of polyfoam, for example, of the type used for Christmas decorations and the like. To increase the electrical distance from the aluminum sheet 42 to the potatoes 50, a high dielectric constant spacer 60 may be provided. This will have the effect of increasing the electrical spacing beyond that which would otherwise be possible and thus permits the conservation of space in compact food packages. While the use of dielectric elements to concentrate energy in microwave ovens is broadly known, the use of different dielectric constant materials to selectively concentrate energy where desired is considered to be a useful collateral feature of the present invention.

FIG. 3 shows still another form of the invention, in which the packaging is somewhat simplified. In FIG. 3 the apparatus 72 directs microwave energy toward a frozen package 74. The package is held in position by a conductive shield member 76 and the toggle clamp 78. Hinges 79 or additional clamps may be provided at the other side of the shield 76. While the various elements are shown loosely positioned in FIG. 3, for ease in representation, the frozen food package 74 would actually be firmly pressed in conductive engagement with the member 72 along the rim 80 where it is adjacent the conductive structure 72. The space between the shield 76 and the flange 82 is such that the frozen food package will be securely forced against the inner shoulder of structure 72 along its rim 80 before there is any engagement between members 76 and 82.

Now, considering the frozen food package per se, it is similar in many respects to the package shown in FIG. 1. It is, however, arranged so that the unit as sold in the supermarket may be directly inserted into the microwave oven. No extra outer cardboard package is required. The package of FIG. 3 includes the outer aluminum wrapper 84 and a heavy dielectric sheet 86 which forms the upper closure of the package. The aluminum wrapper 84 is bent over the peripheral edges of the dielectric sheet 86 and glued or otherwise secured along its edge 88. The food portions 90, 92, and 94 are mounted in a plate 96 of dielectric material, such as cardboard coated with plastic, molded Teflon, for specific examples. The outer edge of the container may be provided with a dielectric reinforcing strip 98 for supporting the package against compression during the gluing at the area 88, and under compression by the toggle clamp 78. The dielectric block 100 may be of high dielectric constant material to increase the heating of the potatoes 92 as discussed in connection with block 60 in FIG. 2. At points between the toggle clamp or clamps 78 and pivot point 79 one or more switch actuating buttons 102 are provided for interlock purposes to enable application of microwave energy to the conductive structure 72.

Concerning the matching flanges of conductive structure 72 and shield 76, they are preferably one-quarter wave length in length from the zone 80 to their matching outer peripheries. With this arrangement, even if there is some leakage at point 80, the opening at the outer periphery appears as a short circuit at point 80 and no microwave energy will escape. Alternatively, if the outer peripheries are in electrical contact as by spring elements, the distance should be one-half wave length from zone 80 to the short-circuited outer edges of members 72 and 76.

FIG. 4 illustrates another microwave cooking arrangement in accordance with the present invention. FIG. 4 includes a microwave source 108, which is not provided with mode mixing arrangements, and an open-ended wave guide or microwave oven 110. Secured to the lower end of the oven is a food package having a lower conductive sheet 112. A flange 114 of the conductive sheet 112 is mechanically secured to a corresponding flange 116 at the open end of the oven 110, by arrangements to be discussed in greater detail below.

The nature of standing electromagnetic waves in a conductively bounded cavity has been the subject of considerable analysis in the technical and patent literature. Techniques for establishing modes of predetermined types are well known and are described in Reissue Patent 23,019 of W. W. Hansen and in many other publications. In the embodiment of FIG. 4, the microwave source 108 produces a simple electromagnetic field pattern having a central null plane 118. With the field pattern as shown in FIG. 4, the distance across the oven is equal to or greater than a full wave length in free space, and the distance from one side wall to the null plane 118 is a half wave length at the operating frequency.

It is noted in passing that the frequency bands prescribed by the Federal Communications Commission for use with microwave heating include frequencies of the order of 915 megacycles, 2.45 kilomegacycles, and 5.85 kmcs., with the resulting wave lengths of 33, 12 and 5 centimeters, respectively. Using the intermediate frequency of about 2.45 kmcs., the distance across the oven could be equal to or range upward from 12 cms., or about 5 inches, with the mode pattern as shown in FIG. 4.

The heating effect is generally proportional to the magnitude of the electrical field within the microwave oven. Thus, as mentioned above the heating effect is very low at the side walls or bottom of the oven cavity adjacent the metal boundary of the oven. Similarly, it drops substantially to zero at the null plane 118 and at the other null planes of the oven as indicated by the pattern shown in FIG. 4. In accordance with one aspect of the present invention, the food portion separations 120 of the food package 112 are coincident with the null planes of the field pattern within the microwave oven. This can be accomplished in more than one direction, of course, as the food container 112 may be provided with 4, 6 or more separate compartments. In the case of a four compartment food unit, the oven 110 would be excited in a mode having four field configurations in the horizontal plane, separated by two null planes passing through the center of the oven. Similarly, with six separate compartments of the food container, the oven would be excited to provide three null planes corresponding in location to the separations of the food package.

The flanges 114 and 116 of the food package and oven, respectively, are secured together by an arrangement which will now be considered. Initially, the oven flange 116 has a thin insulating layer 122 and an outer rim 124 with lossy material secured to it. The insulating or dielectric material 122 may be of Teflon or other well known microwave dielectric material. The outer rim 124 may be of rubber impregnated with carbon, ferrite or other iron oxide materials to absorb microwave energy. The width of the flanges 114 and 116 are preferably approximately equal to one-quarter wave length so that the open circuit presented at the outer rim of the flange will appear as a short circuit at the inner boundary of the conductive cavity. To completely seal the cooking apparatus against possible radiation, an outer conductive spring element 126 may be provided. This springy conductive member 126 may also be hinged or otherwise removable at least on one side to facilitate mounting of the food package 112 in position and removal following the cooking operation.

For completeness, it is useful to mention the microwave properties of various foods which obviously affect the considerations discussed above. With regard to the relative microwave properties of meat and vegetables, in general, pieces of meat and other forms of protein will be more lossy, and therefore absorb more microwave energy than various forms of vegetable material. Food stuffs having high salt and liquid contents are relatively lossy since an ionized liquid is susceptible to both induction and dielectric heating effects. However, fatty foods tend to be less lossy.

FIGS. 5 and 6 constitute alternative views of another food package which may be employed with the open microwave or wave guide structures shown in FIGS. 1, 3 or 4. FIG. 6 is a view taken along lines 6—6 of FIG. 5. The arrangement of FIGS. 5 and 6 utilizes supplemental radiating elements for increasing the intensity of microwave energy in accordance with principles broadly disclosed in patent application Serial No. 255,639, filed February 1, 1963, of Edward Z. Krajewski, entitled "Microwave Heating Apparatus," filed concurrently with this patent application.

With reference to the detailed structure of FIGS. 5 and 6, the food container 130 includes two frankfurters 132 and 134, and a central portion of chile 136. The chile in the frozen state constitutes a substantial mass of food which requires high intensity microwave energy for proper heating, as compared with the smaller and thinner frankfurters 132 and 134. To achieve a higher degree of heating for the chile, it is placed in the center of the aluminum walled container well away from the sides 138, 140, 142 and 144 of the container. To further increase the heating effect toward the center of the chile, two one-quarter wave length conducting elements 146 and 148 are provided. They are short-circuited to the bottom 154 of the package by a strip which underlies the main container of food. The two elements 146 and 148 may actually be the two upstanding legs of a U shaped strip of aluminum foil. The stubs 146 and 148 extend upwardly to a point somewhat below the upper surface of the chile to concentrate energy toward the center of the chile mass.

As discussed in some detail in the copending patent application cited above, a quarter wave length stub short-circuited to a wall of a microwave cavity has a high voltage point at its free end. Accordingly, microwave energy is concentrated between the outer ends of the elements 146 and 148 to speed the thawing and heating of the central portion of the chile. On either side of the food portion 136, small plastic bags 150 and 152 may be provided with onions and hot peppers, respectively, for seasoning the chile. As these plastic bags 150 and 152 are immediately adjacent the side walls 140 and 144 and the bottom wall 154 of the aluminum food container, they will not be heated appreciably but will merely be defrosted to a point suitable for selective application to the chile.

The chile 136 and frankfurters 132 and 134 are mounted on a dielectric support or dish 156 which is transparent to microwaves. The support 156 holds the chile and frankfurters well above the lower surface 154 of the aluminum outer package so that they receive microwave energy at an adequate intensity level. The intensity of microwave energy at the frankfurters 132 and 134 is appreciably less than at the chile 136, in view of the proximity of the frankfurters to the conductive side walls 138 and 140 of the package.

A dielectric sheet 158 seals the food package. It may be noted in passing that, in each case, the bottom of the food package may be transparent to microwave energy and the top of the food package may be conductive. In accordance with the selected geometry, the side walls may be either conductive or non-conductive, depending on the location of the seal with the source of microwave energy. With such an arrangement, the microwave chamber or wave guide would be closed by the upper surface of the package and energy would be transmitted through the bottom. In this case, the food could be selectively spaced from the upper metal foil rather than from the bottom of the package. The supplemental radiating elements of FIGS. 5 and 6 may, of course, be used in the packages having a conductive upper surface. The other necessary modifications for accommodating this change are obvious to one skilled in the art.

In considering the overall aspects of the present invention, the cooking apparatus of FIGS. 1, 3 and 4 include a wave guide which is bounded at one end by a cooking package so that wave guide and package together form a resonant cavity. Further, the food package per se has dimensions such that it is resonant at the frequency of energization of the microwave source. This is true of the embodiments of FIGS. 1 and 3, as well as the arrangement of FIG. 4 in which the resonant field patterns are particularly emphasized and have been described in detail. Thus, in FIG. 4 the individual food compartments of the package are resonant with the mode pattern generated within the main portion 110 of the oven wave guide. In the embodiments of FIGS. 1, 2 and 3, however, the food packages are not necessarily partitioned to conform with modes, but have dimensions so that incident microwave energy may readily penetrate and set up resonant standing waves in the volume of the package within the outer and lower conductive side walls of the package.

It is to be understood that the above described arrangements are illustrative of the application of the principles of the invention. Numerous other arrangements may be devised by those skilled in the art without departing from the spirit and scope of the invention. Thus, by way of example and not of limitation, the food packages described above may be circular or rectangular, or have any other desired shape; the wave guide coupling the microwave source to the food package may be provided with adaptors to accommodate different size food packages; and, in addition, known mechanical or electrical variants of the arrangements described hereinabove may be employed. Accordingly, from the foregoing remarks, it is understood that the present invention is to be limited only by the spirit and scope of the appended claims.

What is claimed is:

1. A food package for microwave heating applications comprising a container having a base and sides and internally divided into a plurality of sections for receiving different types of foods, an electrically conducting material of continuous sheet like form being provided at one of the base or sides of the container, a first food portion requiring the application of higher intensity microwave energy located in one of said sections and spaced by a given electrical distance from said conducting material, a second food portion requiring the application of substantially lower intensity microwave energy located in a different section and electrically spaced substantially closer to said conducting material, dielectric support means within said container for spacing said first and second food portions at said different electrical distances, said container adapted to be exposed to microwave energy in a direction through said food portions toward said conducting material whereby said food portions spaced electrically closer to said conducting material are heated to lower temperatures than said food portions spaced further from said conducting material.

2. A food package for microwave heating comprising an outer aluminum container having a bottom and enclosing sides and internally divided into a plurality of sections containing different foods, dielectric support means for mounting said different foods at respectively different electrical distances from the bottom of said aluminum container with the foods to be more highly heated being mounted electrically further from the bottom, and a dielectric cover which is essentially transparent to microwave energy covering the top of the container, said package adapted to be exposed to microwave energy through the dielectric cover whereby said different types of foods are heated to higher temperatures depending upon the electrical distance of the food away from the bottom of the container.

3. In the food package of claim 2, said aluminum container having an upper lip which overlies said dielectric cover around the periphery of the upper surface of the package.

4. In the food package of claim 2, said aluminum container having an upper edge turned over into a plane substantially parallel to the bottom of the container for conductive engagement with a source of microwave energy.

5. A food package for microwave heating comprising an outer aluminum container having a bottom and enclosing sides and containing a series of different foods requiring different degrees of heating, dielectric supports for mounting said different foods at different electrical distances from the bottom of the container with the foods to be more highly heated being electrically spaced further from the bottom than those requiring less heating, a dielectric cover which is essentially transparent to microwave energy covering the top of the container, said aluminum container having an upper lip which overlies said dielectric cover around the periphery of the upper surface of the package, and a reinforcing member located within the sides of said aluminum container and underlying said lip, said package adapted to be exposed to microwave energy to heat said different foods to different temperatures depending upon the relative electrical spacing of the foods from the bottom of the container.

References Cited by the Examiner

UNITED STATES PATENTS

| | | | |
|---|---|---|---|
| 2,582,174 | 1/1952 | Spencer | 99—221 |
| 2,586,754 | 2/1952 | Wild | 219—10.55 |
| 2,599,033 | 6/1952 | Wild | 219—10.55 |
| 2,600,566 | 6/1952 | Moffett | 99—221 |
| 2,714,070 | 7/1955 | Welch | 219—10.55 |
| 2,956,144 | 10/1960 | Woodman | 219—10.55 |
| 3,067,922 | 12/1962 | Hill | 220—20 X |

FOREIGN PATENTS 1,097,594   1/1961   Germany.

A. LOUIS MONACELL, *Primary Examiner.*

RICHARD M. WOOD, *Examiner.*

L. H. BENDER, H. LORD, *Assistant Examiners.*